United States Patent [19]

Hornung et al.

[11] Patent Number: 5,390,891
[45] Date of Patent: Feb. 21, 1995

[54] APPARATUS FOR MOUNTING EQUIPMENT IN A SHOCK ABSORBING MANNER

[75] Inventors: Ernst Hornung, Stuhr; Hans Maager, Worpswede; Huba Oery, Aachen, all of Germany

[73] Assignee: ERNO Raumfahrttechnik GmbH, Bremen, Germany

[21] Appl. No.: 72,144

[22] Filed: Jun. 4, 1993

[30] Foreign Application Priority Data

Jun. 5, 1992 [DE] Germany ............... 4218586

[51] Int. Cl.6 .................................... F16M 13/00
[52] U.S. Cl. .................. 248/581; 248/603; 248/248
[58] Field of Search ........... 248/581, 300, 247, 248, 248/555, 556, 557, 604, 603, 610, 675, 674, 617

[56] References Cited

U.S. PATENT DOCUMENTS

| | | | |
|---|---|---|---|
| 1,767,397 | 6/1930 | Ragland | 248/248 |
| 2,014,581 | 9/1935 | Norton | 248/581 |
| 2,321,916 | 6/1943 | Ingerman | 248/248 |
| 2,700,475 | 1/1955 | Stalter | 248/248 |
| 2,911,690 | 11/1959 | Sanford | 248/300 |
| 3,140,071 | 7/1964 | Lorentzen | 248/300 |
| 3,279,461 | 10/1966 | Oliver | 248/581 X |
| 4,705,982 | 11/1987 | Besson et al. | 248/603 X |
| 4,713,714 | 12/1987 | Gatti et al. | 248/581 X |
| 4,974,840 | 12/1990 | Thompson et al. | 248/300 X |
| 5,167,396 | 12/1972 | Burba et al. | 248/610 |

*Primary Examiner*—Alvin C. Chin-Shue
*Assistant Examiner*—Korie H. Chan
*Attorney, Agent, or Firm*—W. G. Fasse; W. F. Fasse

[57] ABSTRACT

Shock sensitive equipment, for example, instruments in a spacecraft, must be protected against impacts, for example, those caused by severing explosions that separate the spacecraft from a used up rocket. For this purpose a platform carrying the component to be protected is secured to support structures of the craft by elastic spring devices, each of which has a low eigenfrequency or resonant frequency and a low damping constant, whereby the mounting is preferably so that friction forces are minimized. For example, the spring devices have a U-configuration connected to an L-configuration. Contact surface area minimizing ring spacers may be inserted between the platform and the spring devices.

6 Claims, 2 Drawing Sheets

APPARATUS FOR MOUNTING EQUIPMENT IN A SHOCK ABSORBING MANNER

FIELD OF THE INVENTION

The invention relates to an apparatus for mounting equipment in a shock absorbing manner, for example in a spacecraft, to prevent especially dynamic loads or single impacts to reach the equipment. Such shocks occur, for example, when a burned-out rocket stage is separated from a spacecraft, e.g. by pyrotechnic explosion.

BACKGROUND INFORMATION

It is known to mount equipment on a support through elastic elements for damping any impacts causing adverse loads on the equipment. For example, a burned-out stage of a rocket is separated from the spacecraft by small explosions which sever the connection between the burned-out rocket stage and the spacecraft to separate the two from each other. Such small explosions cause so-called pyrotechnic shocks which can cause quite substantial dynamic loads on the equipment carried in the spacecraft, such as delicate instrumentation and other components within the craft. Such dynamic loads have been known to damage the equipment. Thus, it is known to eliminate or at least minimize the effects of such impacts on the equipment by mounting impact sensitive structural components inside a separate container or on a carrier such as a platform, whereby the container or platform in turn are secured to the body structure of the spacecraft through damping elements. Such damping elements conventionally contain viscoelastic material. However, impacts, especially those caused by the above mentioned separating explosions, have very high shock velocities, whereby conventional damping elements transmit in addition to the spring force, also a damping force through the viscoelastic material. As a result, substantial forces still reach the shock sensitive structural components.

OBJECTS OF THE INVENTION

In view of the foregoing it is the aim of the invention to achieve the following objects singly or in combination:

to construct a mounting of the type mentioned above in such a manner that especially the impacts or shocks caused by the separating explosions in a spacecraft are prevented or at least substantially attenuated from reaching shock sensitive components inside the spacecraft;

to effectively protect shock sensitive components, especially in a spacecraft, against low frequency impacts including single impacts; and to construct elastic spring devices for a shock absorbing mounting in such a manner that shock absorption is accomplished in the direction of six degrees of freedom, three being translational and three being rotational degrees of freedom.

SUMMARY OF THE INVENTION

According to the invention an equipment carrying platform is mounted to the structure of a supporting body through a plurality of elastic damping elements in the form of elastic spring elements, each having a low damping constant, wherein each elastic spring device is preferably connected to the platform through spacers providing a minimal surface contact between the platform and the respective spring devices.

By constructing the present spring devices so that they have a low damping constant and an eigenfrequency or resonant frequency as small as possible, the mounting is now capable of absorbancy substantially completely low frequency impacts including impacts caused by the above mentioned pyrotechnical severing or separating explosions. Thus, it is now possible to avoid the use of viscoelastic damping materials altogether and to effectively protect shock sensitive structural components even against low frequency or single impacts in a reliable manner.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
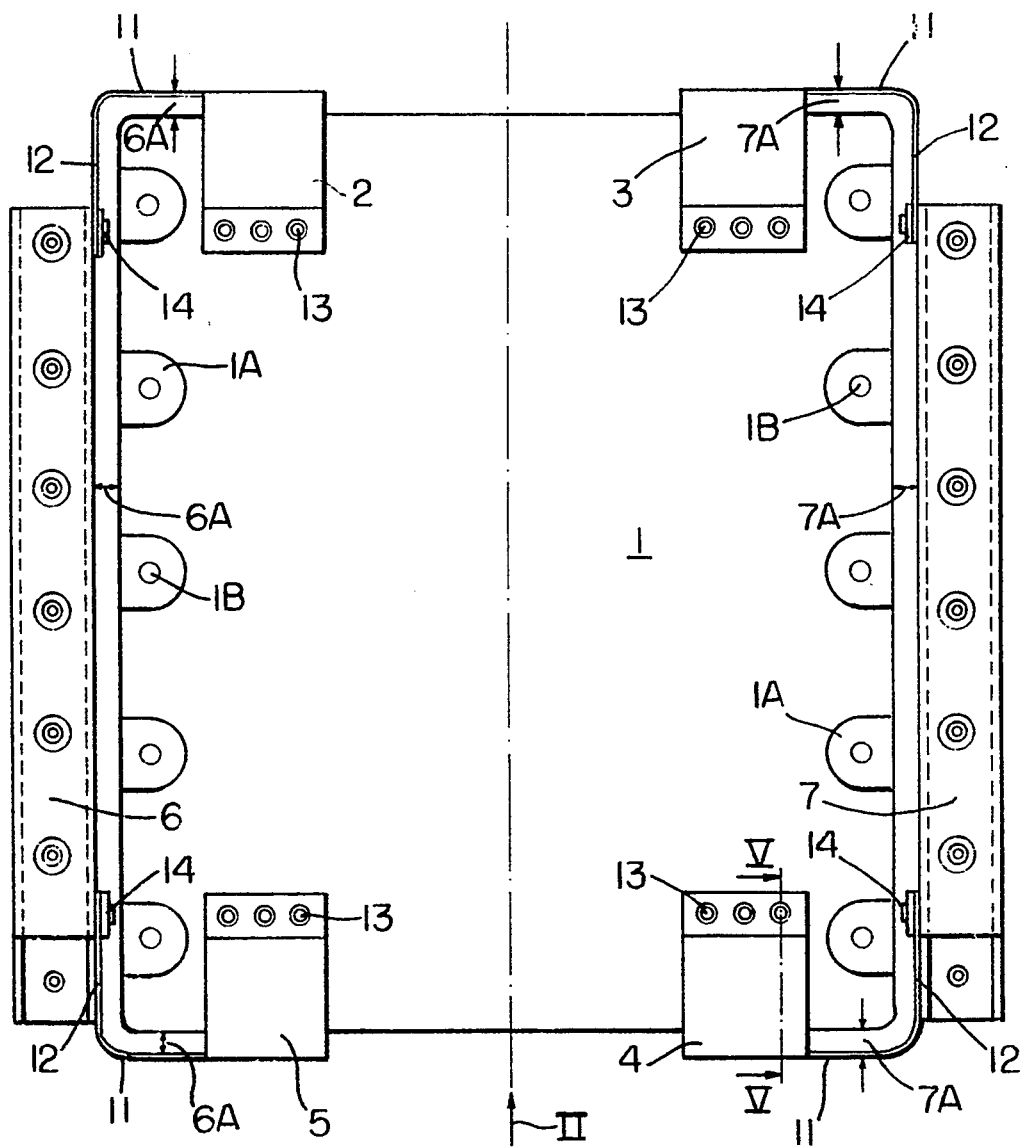
FIG. 1 is a top plan view of a platform mounted by four elastic spring devices to structural supports.
Figure 2:
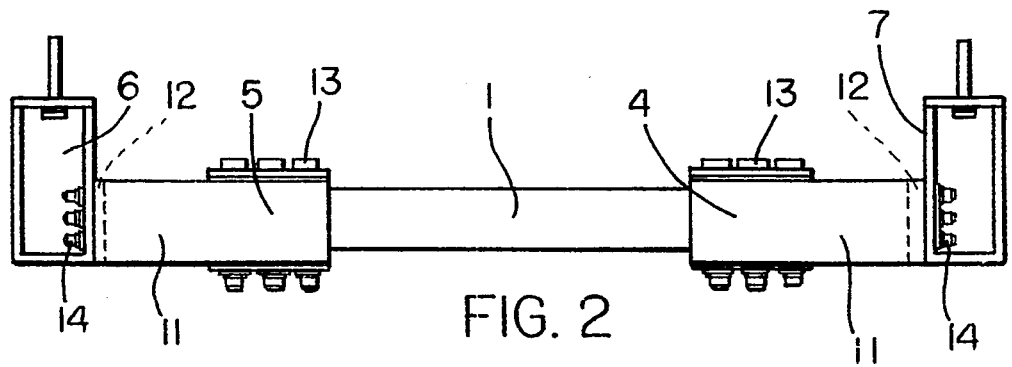
FIG. 2 is a view in the direction of the arrow II in FIG. 1.

Referring to FIGS. 1 and 2 a platform 1 for mounting impact equipment, not shown, to structural supports for example support rails 6 and 7 in a spacecraft, is secured to the support 6 by two elastic spring devices 2 and 5, and to the support 7 by two elastic spring devices 3 and 4. All elastic spring devices are of the same construction and will be described in more detail below with reference to FIG. 4. The elastic spring devices 2, 3, 4, and 5 are so secured to the platform 1 and to the supports 6 and 7 that a spacing or clearance 6A is provided between the left-hand edge of the platform 1 and the support 6, while a spacing or clearance 7A is provided between the right-hand edge of the platform 1 and the support 7. In FIG. 1 the platform has mounting pads 1A with threaded or through-holes 1B for securing a shock sensitive component to the platform 1.

The construction of the elastic spring devices 2, 3, 4, and 5 according to the invention is such that an effective shock absorption is accomplished with regard to six degrees of freedom, namely against translational movement in the directions of the axes of a three-dimensional coordinate system, and also around the three axes of such a coordinate system. Further, the elastic spring devices 2 to 5 are so constructed that they have a very low eigenfrequency or resonant frequency and a small damping coefficient with regard to oscillations, especially low frequency oscillations relative to the mentioned six degrees of freedom.

Figure 5:
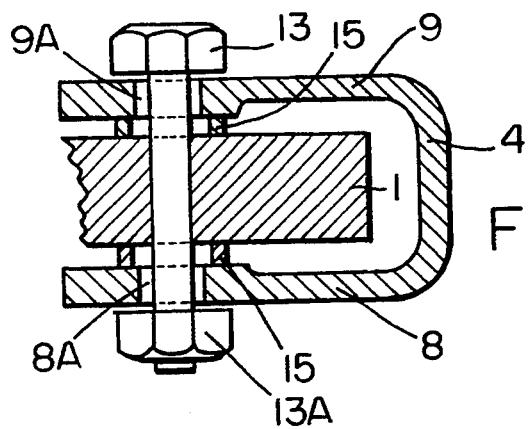
FIG. 5 is a sectional view along section line V—V in FIG. 1.

The connection of the elastic spring devices to the platform 1 is accomplished with the aid of through-holes and nuts and bolts 13. Similarly, the connection of the elastic spring devices to the structural components 6, 7 is also accomplished with through-holes and nuts and bolts 14. It is advantageous and hence preferable that the contact surface between the elastic spring devices 2 to 5 and the platform 1 is kept as small as possible to minimize friction forces. FIG. 5 illustrates this feature of the invention as will be described in more detail below with reference to FIG. 5.

Figure 3:
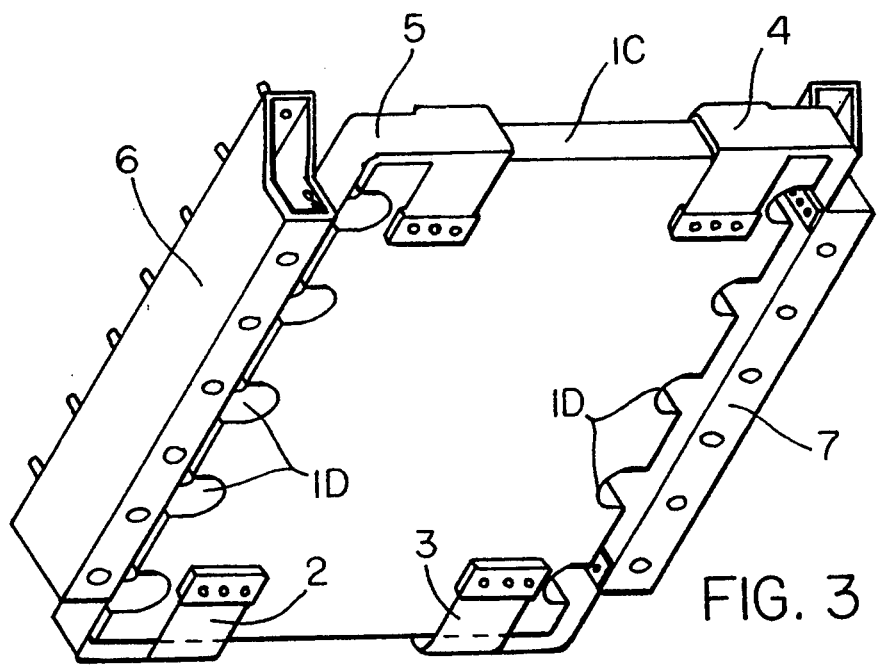
FIG. 3 is a perspective view of an embodiment similar to that of FIG. 1, but showing a modified platform.

The structure of FIG. 3 is substantially the same as that of FIG. 1, except that the platform 1C is provided with mounting recesses 1D rather than with mounting pads. Projections of a component to be mounted on the platform 1C are received in the recesses 1D.

Figure 4:
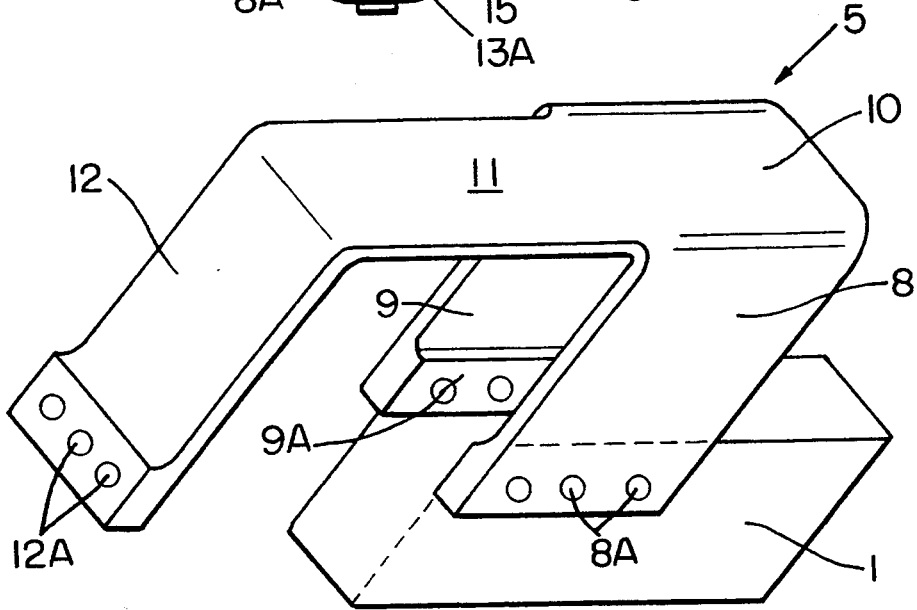
FIG. 4 shows a perspective view of one of the elastic spring devices.

FIG. 4 illustrates one embodiment of an elastic spring device according to the invention. The elastic spring devices shown in FIGS. 1, 2, and 3 are all of an identical construction. Each elastic spring device 2, 3, 4, and 5 has several spring elements including a crosspiece or land 10 with legs 8 and 9 forming a U-configuration and a spring projection 11. The land 10 extends into the projection 11 carrying a further leg 12. As shown, the projection 11 and the leg 12 are arranged at right angles to each other. However, the land 10, the projection 11, and the leg 12 could also have a circular configuration for attachment of the elastic spring devices to a circular platform. The free end of each leg 8, 9, and 12 is somewhat thickened and provided with through-holes 8A, 9A and 12A for mounting the elastic spring devices with the legs 8 and 9 to the platform 1 or 1C and with the leg 12 to the support structure 6, 7. FIG. 4 also shows that the free ends of the spring elements 8, 9, and 12 are thickened thereby reducing the surface contact area between the elements 8, 9 and the platform 1, and between the leg 12 and the platform.

FIG. 5 shows the preferred connection of the elastic spring device 4 to the platform 1. While it is possible to use regular washers between the head of the bolt 13 and the leg 9 of the elastic spring device 4, and also between the nut 13A and the leg 8 of the elastic spring device 4, it is advantageous and hence preferable that the contact area between the legs 8 and 9 and the platform is minimized. For this purpose, the preferred embodiment of the invention provides spacers such as spacer rings 15 as shown in FIG. 5. The spacer rings 15 have a very small axial width and thin walls sufficient to sustain the clamping force exerted by the bolt and nut connection without flattening the spacer rings 15. Such rings may be made, for example by cutting off short sections from a pipe.

As shown in FIG. 4, the elastic spring devices 2, 3, 4, and 5 are preferably made as single piece structures milled out of a spring elastic metallic material. However, the elastic spring devices may also be produced by layering composite prepregs into the desired configuration and then curing the layered structure. Suitable reinforcing fibers and resin matrix materials are well known in the art. Instead of forming the elastic spring devices as a single piece integral structure as shown in FIG. 4, it is also possible to construct these elastic spring devices in, for example, two sections, whereby one section forms the U-configuration and the other section forms the L-configuration. The two sections are then interconnected, for example, by screws, soldering, brazing, welding, or adhesive bonding.

Each of the elastic spring devices 2 to 5 is capable to damp impacts in the three directions of space in a spring elastic manner. However, it is also possible according to the invention to replace at least one of the four elastic spring devices at a corner of the platform 1 by three helical springs at least one of which is mounted to extend perpendicularly to the other two helical springs.

In all instances it is important that the eigenfrequency or resonant frequency of each elastic spring devices is as low as possible and that each device has a small damping constant. Further, friction between the spring elements and the platform should preferably be minimized. The combination of these features as taught by the invention makes sure that even low frequency shocks and single impacts are kept from reaching the platform 1, whereby equipment mounted on the platform is reliably protected against adverse influences by such impacts and shocks as are caused, for example by the above mentioned severing or separation explosions.

Although the invention has been described with reference to specific example embodiments, it will be appreciated, that it is intended to cover all modifications and equivalents within the scope of the appended claims.

What we claim is:

1. An apparatus for mounting equipment in a shock absorbing manner to a support, comprising a platform, a plurality of shock absorbing elastic spring devices securing said platform to said support, each of said elastic spring devices having a low damping constant, and means for fixedly connecting said elastic spring devices to said platform and to said support, each of said elastic spring devices comprising three leaf spring elements and a land arranged so that two of said leaf spring elements are interconnected by said land (10) forming a U-configuration with said two leaf spring elements extending in parallel to each other, and wherein a third leaf spring element of said three leaf spring elements forms substantially an L-configuration extending laterally away from said land of said U-configuration surface area contact reducing members between said elastic spring devices and said platform, and wherein, said apparatus further comprising surfaces of said third leaf spring element extend at a right angle to surfaces of said two leaf spring elements, and at least one of said leaf spring elements does not directly contact the platform during operation.

2. The apparatus of claim 1, wherein said elastic spring devices form a mounting suspension having a low eigenfrequency or resonance frequency.

3. The apparatus of claim 1, wherein all three leaf spring elements and said land form a single piece integral structure.

4. The apparatus of claim 1, wherein said elastic spring devices are made of a fiber composite material.

5. The apparatus of claim 1, wherein said surface area contact reducing members comprise spacer rings at least between said two leaf spring elements (8, 9) and said platform.

6. The apparatus of claim 1, wherein said surface area contact reducing members are integral parts of said leaf spring elements.

* * * * *

UNITED STATES PATENT AND TRADEMARK OFFICE
CERTIFICATE OF CORRECTION

PATENT NO. : 5,390,891

DATED : February 21, 1995

INVENTOR(S) : Hornung et al.

It is certified that error appears in the above-identified patent and that said Letters Patent is hereby corrected as shown below:

On title page,

In [56] References Cited, the patent date for "Burba et al." should be --12/1992--.

Col. 2, line 6, replace "absorbancy" by --absorbing--;

line 65, after "components" insert --or supports--.

Col. 4, claim 1, line 39, after "configuration" insert --, said apparatus further comprising--;

Claim 1, line 41, delete ", said";

Claim 1, line 42, delete "apparatus further comprising".

Signed and Sealed this

Twenty-fifth Day of April, 1995

*Attest:*

BRUCE LEHMAN

*Attesting Officer*     *Commissioner of Patents and Trademarks*